(12) United States Patent
O'Reilly

(10) Patent No.: US 9,178,949 B2
(45) Date of Patent: Nov. 3, 2015

(54) METHOD, SYSTEM AND APPARATUS FOR MANAGING PUSH DATA TRANSFERS

(75) Inventor: Jacob Samuel O'Reilly, Fredericton (CA)

(73) Assignee: BLACKBERRY LIMITED, Waterloo (CA)

( * ) Notice: Subject to any disclaimer, the term of this patent is extended or adjusted under 35 U.S.C. 154(b) by 101 days.

(21) Appl. No.: 12/819,335

(22) Filed: Jun. 21, 2010

(65) Prior Publication Data

US 2011/0217953 A1 Sep. 8, 2011

Related U.S. Application Data

(60) Provisional application No. 61/310,016, filed on Mar. 3, 2010.

(51) Int. Cl.
*H04L 29/06* (2006.01)
*H04L 29/08* (2006.01)

(52) U.S. Cl.
CPC ............ *H04L 67/20* (2013.01); *H04L 67/26* (2013.01); *H04L 69/28* (2013.01)

(58) Field of Classification Search
CPC ......... H04L 67/26; H04L 67/04; H04L 29/06; H04L 67/06; H04L 67/2814; H04L 69/329; H04L 67/02; H04L 67/1002; H04L 12/14; H04L 1/1887; H04L 47/10; H04L 67/40; H04L 12/5895; H04L 67/14; H04L 67/28; H04L 12/585; H04L 1/188; H04L 45/22; H04W 80/00; H04W 80/04; H04W 80/10; H04W 76/062; H04W 88/182; H04W 92/24; H04W 36/0011; H04W 40/00; H04W 88/16; H04W 88/18; H04W 76/045; H04W 28/08; H04W 28/16; H04W 80/06
USPC .......... 455/412.1–420, 404.1–404.2, 455/3.01–3.06, 466, 456.1–457; 709/201–207; 370/229, 230, 230.1, 370/235, 312, 328, 431–433
See application file for complete search history.

(56) References Cited

U.S. PATENT DOCUMENTS 7,353,295 B1 4/2008 Crow et al.
2002/0015403 A1* 2/2002 McConnell et al. .......... 370/352
(Continued)

FOREIGN PATENT DOCUMENTS

EP 1098489 A2 5/2001
EP 1865744 A1 12/2007
(Continued)

OTHER PUBLICATIONS

European Patent Application No. EP 10 16 6650 Search Report mailed Nov. 22, 2010.
(Continued)

*Primary Examiner* — Vladimir Magloire
*Assistant Examiner* — Erica Navar
(74) *Attorney, Agent, or Firm* — Perry + Currier Inc.

(57) ABSTRACT

A method, system, and apparatus for managing push data transfers is provided whereby in one implementation at least one push data server is situated on a network between a plurality of content servers and a plurality of computing devices. The push data server is configured to only perform a maximum number of concurrent data transfers of content between the content servers and the plurality of computing devices. The push data server is configured to deem that a particular push data transfer has been completed even if no express acknowledgment of such completion is ever received at the push data server, thereby reducing the likelihood of failure of push data transfers due to a misperception that the maximum number of concurrent data transfers being obtained.

17 Claims, 4 Drawing Sheets

(56) References Cited

U.S. PATENT DOCUMENTS

| | | | |
|---|---|---|---|
| 2002/0029273 A1* | 3/2002 | Haroldson et al. | 709/226 |
| 2002/0143964 A1 | 10/2002 | Guo et al. | |
| 2002/0194325 A1* | 12/2002 | Chmaytelli et al. | 709/224 |
| 2002/0197991 A1 | 12/2002 | Anvekar et al. | |
| 2003/0045273 A1* | 3/2003 | Pyhalammi et al. | 455/412 |
| 2003/0066065 A1 | 4/2003 | Larkin | |
| 2004/0045000 A1 | 3/2004 | Hara | |
| 2004/0083317 A1* | 4/2004 | Dickson et al. | 710/22 |
| 2004/0122907 A1 | 6/2004 | Chou et al. | |
| 2005/0027846 A1 | 2/2005 | Wolfe et al. | |
| 2005/0132083 A1 | 6/2005 | Raciborski et al. | |
| 2005/0163072 A1* | 7/2005 | Park et al. | 370/328 |
| 2005/0165948 A1* | 7/2005 | Hatime | 709/235 |
| 2005/0201320 A1 | 9/2005 | Kiss et al. | |
| 2006/0129638 A1 | 6/2006 | Deakin | |
| 2007/0268515 A1 | 11/2007 | Freund et al. | |
| 2008/0049620 A1* | 2/2008 | Riga et al. | 370/236 |
| 2008/0066190 A1 | 3/2008 | Shu et al. | |
| 2008/0091835 A1 | 4/2008 | Yuan | |
| 2008/0140650 A1 | 6/2008 | Stackpole | |
| 2008/0256607 A1 | 10/2008 | Janedittakarn et al. | |
| 2008/0262994 A1* | 10/2008 | Berry et al. | 707/1 |
| 2009/0069001 A1 | 3/2009 | Cardina et al. | |
| 2009/0112981 A1 | 4/2009 | Markovich | |
| 2009/0252325 A1 | 10/2009 | Reus et al. | |
| 2010/0010899 A1 | 1/2010 | Lambert et al. | |
| 2010/0180016 A1 | 7/2010 | Bugwadia et al. | |
| 2010/0317320 A1 | 12/2010 | Sakargayan | |
| 2011/0035589 A1 | 2/2011 | Butcher et al. | |

FOREIGN PATENT DOCUMENTS

| | | | |
|---|---|---|---|
| WO | 01/95587 A2 | 12/2001 | |
| WO | 2005/015935 A1 | 2/2005 | |
| WO | 2007/111598 A1 | 10/2007 | |

OTHER PUBLICATIONS

European Patent Application No. 10154679.4 Search Report mailed Oct. 21, 2010.
Related European Patent Application No. 10165549.6 Search Report dated Jun. 8, 2011.
BitTorrent, downloaded from http://www.cs.chalmers.se/~tsigas/Courses/DCDSeminar/Files/BitTorrent.pdf.
How Instant Messaging Works, downloaded from http://communication.howstuffworks.com/instant-messaging2.htm.
Jajah, Mobile Plug in, downloaded from http://www.jajah.com/support/faq/plugin/.
Emt-POstimees News, downloaded from http:/www.emt.ee/wwwmain?screenId=content.private
&componentId=MenuComponent&actionid=menuSelect
&actionPharm=1161&language=ENG.
White Paper, K800, Published by Sony Ericsson Mobile Communications AB, Feb. 2006.
Non-hacked iPhones not recognizing SIM cards after 1.1.1. update, downloaded from http://reviews.cnet.com/8301-19512_7-10115181-233.html.
http://forums.appleinsider.com/archive/index.php/t-76110.html.
Canadian Patent Application No. 2682833 Office Action dated Jan. 23, 2012.
Pdf document: Mobile Java Push; Mar. 2009 downloaded from http://web.archive.org/web/20090511131417/http://labs.ericsson.com/apis/mobile-java-push/.
YouTube video—Mobile Java Push—Quick Start; Uploaded by MobileJavaPush on Mar. 31, 2009.

* cited by examiner

METHOD, SYSTEM AND APPARATUS FOR MANAGING PUSH DATA TRANSFERS

PRIORITY CLAIM

The present specification claims priority from U.S. Provisional Patent Application 61/310,016 filed Mar. 3, 2010, the contents of which are incorporated herein by reference.

FIELD

The present specification relates generally to telecommunications and more particularly relates to a method, system and apparatus for managing push data transfers.

BACKGROUND

Computing devices that connect to servers frequently connect to those servers via one or more network intermediaries, such as a mobile telecommunication carrier, an enterprise, or a manufacturer of the computing device. Increasingly data is pushed to those computing devices from those servers.

DETAILED DESCRIPTION OF THE EMBODIMENTS

Figure 1:
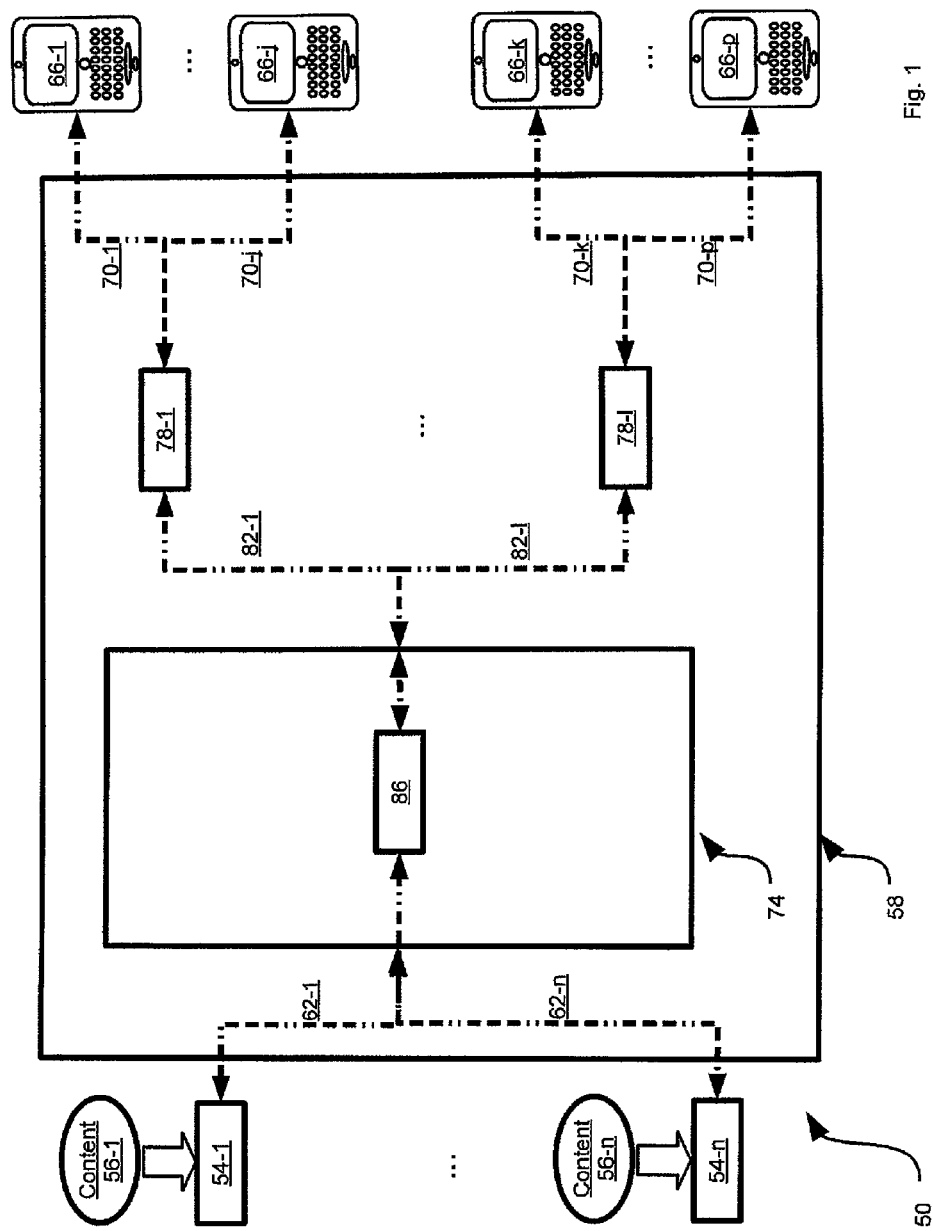
FIG. 1 shows a schematic representation of a system for managing push data transfers.

An aspect of this specification provides a method for managing push data transfers comprising: receiving content at a push data server from a content server for push delivery to a computing device; beginning a push data transfer of the content to the computing device from the push data server; incrementing a counter for use in determining a maximum number of concurrent push data transfers that can be effected from the push data server; and decrementing the counter after the push data transfer is determined to be actually completed or deemed to be completed.

The method can comprise deeming the push data transfer to be completed after a predefined time limit has been reached; receiving, at the push data server, transfer parameters, the transfer parameters can include data representing parameters of a historic successfully completed push data transfer; and determining the predefined time limit by comparing the transfer parameters.

The transfer parameters can further include at least one of a beginning time and ending time, a transfer duration, a content size, server specifications, and link specifications.

The push data transfer can be determined to be actually completed when an acknowledgement is received, by the push data server, confirming completion of the push data transfer. The comparing can include applying a probability model such that the push data server can infer with a high degree of confidence that the push data transfer is actually completed.

The applying a probability model can include: compiling a table of values of the transfer parameters; and determining a mean and standard deviation for the transfer parameters that best match an expected duration of time to be used as the predefined time limit. The applying a probability model can include employing a cumulative distribution function to determine a minimum time duration to be used as the predefined time limit.

The method can comprise: receiving, at the push data server, a push data transfer request; determining a capacity; comparing the capacity to the counter; and when the capacity equals the counter, queuing the push data transfer request.

The beginning the push data transfer can start when the capacity is greater than the counter. The queuing the push data transfer request can include maintaining, at the push data server, a record of push data transfer requests. The queuing the push data transfer request can include rejecting the push data request.

The rejecting the push data transfer request can include sending an error message to the content server.

The method can comprise tracking of successful push data transfers where acknowledgements of completions are received at the push data server.

Another aspect of the specification provides a push data server comprising a processor configured to: receive content, from a content server, for push delivery to a computing device; begin a push data transfer of the content to the computing device; increment a counter for use in determining a maximum number of concurrent push data transfers that can be effected from the push data server; and decrement the counter after the push data transfer is determined to be actually completed or deemed to be completed.

The processor can be further configured to deem the push data transfer to be completed after a predefined time limit has been reached. The processor can be further configured to: receive transfer parameters, the transfer parameters can include data representing parameters of a historic successfully completed push data transfer; and determine the predefined time limit by comparing the transfer parameters.

The transfer parameters can further include at least one of a beginning time and ending time, a transfer duration, a content size, server specifications, and link specifications.

The processor can be further configured to determine that the push data transfer is actually completed when the processor receives an acknowledgement confirming completion of the push data transfer.

Another aspect of this specification provides a computer program product, for a push data server, comprising a computer readable storage medium having a computer-readable program code adapted to be executable on the push data server to implement a method for managing push data transfers, the method comprising: receiving content at a push data server from a content server for push delivery to a computing device; beginning a push data transfer of the content to the computing device from the push data server; incrementing a counter for use in determining a maximum number of concurrent push data transfers that can be effected from the push data server; and decrementing the counter after the push data transfer is determined to be actually completed or deemed to be completed.

A method, system, and apparatus for managing push data transfers is provided whereby in one implementation at least one push data server is situated on a network between a plurality of content servers and a plurality of computing devices. The push data server is configured to only perform a maximum number of concurrent data transfers of content between the content servers and the plurality of computing devices. The push data server is configured to deem that a particular push data transfer has been completed even if no express acknowledgment of such completion is ever received at the push data server, thereby reducing the likelihood of failure of push data transfers due to a misperception that the maximum number of concurrent data transfers being obtained.

Referring now to FIG. 1, a system for managing pushed data transfers is indicated generally at 50. System 50 comprises a plurality of content servers 54-1 . . . 54-n. (Hereafter, generically each is referred to as server 54, and collectively they are referred to as servers 54. This nomenclature is used elsewhere herein.) Each server 54 is configured to host its own content 56 and to deliver that content 56 to a wide area network (WAN) infrastructure 58 via a respective link 62-1 . . . 62-n (Hereafter, generically each is referred to as link 62, and collectively they are referred to as links 62).

System 50 also comprises a plurality of computing devices 66-1 . . . 66-p. (Hereafter, generically each is referred to as computing device 66, and collectively they are referred to as computing devices 66. Computing devices 66 are configured to connect to WAN infrastructure 58 via their own respective links 70-1 . . . 70-p (Hereafter, generically each is referred to as link 70, and collectively they are referred to as links 70), and, as will be discussed in further detail below, are configured to receive content 56 via a pushed data transfer.

WAN infrastructure 58 also comprises, amongst other things, a main intermediation infrastructure 74 and a plurality of secondary intermediation servers 78-1 . . . 78-l. (Hereafter, generically each is referred to as server 78, and collectively they are referred to as servers 78). Links 82-1 . . . 82-l (hereafter, generically each is referred to as link 82, and collectively they are referred to as links 82) connect intermediation infrastructure 74 and secondary intermediation servers 78.

WAN infrastructure 58 can comprise, or connect to, other computer equipment which is not shown and which may be configured to provide services, applications, other content, or otherwise communicate with, for whatever purpose, to each computing device 66. WAN infrastructure 58 can also comprise, or be part of, the Internet.

Main intermediation infrastructure 74 comprises at least one push server 86, and may also comprise a plurality of additional servers to fulfill other intermediation functions between computing devices 66 and other computer equipment, not shown. At least one push server 86, as will be discussed below, is configured to retrieve content 56 and to simultaneously push retrieved content 56 to a plurality of computing devices 66, subject to a maximum predefined number of transfers.

In one non-limiting implementation, main intermediation infrastructure 74 can be based on the mobile data services (MDS) component from Research In Motion Inc. of Waterloo, Canada, while the secondary intermediation servers 78 can be based on a BlackBerry™ Enterprise Server (BES) or a BlackBerry™ Internet Server (BIS) also from Research In Motion Inc. of Waterloo, Canada. Again, these are non-limiting examples, and in other implementations, for example, main intermediation infrastructure 74 and secondary intermediation servers 78 can be omitted in lieu of including at least one push server 86 within WAN infrastructure 58.

Links 62, links 70, links 82 can be based on any wired structure or wireless structures or combinations thereof. Typically, though not necessarily, computing devices 66 are wireless and therefore at least a portion of link 70 comprises a wireless base station so that link 70 finally connects to each computing device 70 uses one or more wireless protocols, including but not limited to Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers (IEEE) standard 802.11, Bluetooth™ or any of their variants or successors. It is also contemplated each computing device 66 can include multiple radios to accommodate the different protocols that may be used to implement that final portion of link 70.

The portion of each link 70 that connects to its respective server 78 is typically wired and comprises a backhaul wired via a T-carrier link (e.g. T1, T3) or E-carrier link or the like. By the same token, links 82 and 62 are typically wired and can also comprise a backhaul or can otherwise be effected via the Internet 74. In general, the nature of each link 62, 70, and 82 is not particularly limited.

It is to be understood that each server 54, each server 78 and the at least one server 86 can each be implemented using an appropriately configured hardware computing environment, comprising at least one processor, volatile storage (e.g. random access memory), non-volatile storage (e.g. hard disk drive), and at least one network interface all interconnected by a bus. Other components can also be connected to the processor via the bus, such as input devices and output devices. Likewise it is to be understood that the hardware computing environment of any particular server is configured to execute an operating system and other software such that the servers are ultimately configured to perform according to the teachings herein. Furthermore, it will be understood that each server can itself be implemented as several different servers to provide redundancy or load balancing, or alternatively one or more servers in FIG. 1 can be consolidated into a single server.

Like servers 54, the structure and features of each computing device 66 can vary. Typically, however, each computing device 66 thus includes a processor which is configured to receive input from input devices (e.g. a trackball, a joystick, a touch-pad, a touch-screen, a keyboard, a microphone) and to control various output devices (e.g. a speaker, a display, an light emitting diode (LED) indicator, a vibration unit). The Processor is also connected to volatile storage which can be implemented as random access memory, and non-volatile storage which can be implemented using flash memory or the like, or can include other programmable read only memory ("PROM") technology or can include read only memory ("ROM") technology or can include a removable "smart card" or can comprise combinations of the foregoing. Those skilled in the art will now recognize that such volatile and non-volatile storage are non-limiting examples of computer readable media capable of storing programming instructions that are executable on processor.

Each device 66 also includes a network interface, such as a wireless radio, for connecting device 66 to its respective link 70. Each device 66 also includes a battery which is typically rechargeable and provides power to the components of computing device 66. Collectively, one can view the processor and storage of each device 66 microcomputer. It is now apparent that each device 66 can be based on the structure and functionality of a portable wireless device, such as a BlackBerry handheld device, but it is to be stressed that this is a purely non-limiting exemplary device, as device 66 could also be based on any type of client computing device including portable wireless devices from other manufacturers, desktop computers, laptop computers, cellular telephones and the like.

The microcomputer implemented on client 66 is thus configured to store and execute the requisite BIOS, operating system and applications to provide the desired functionality of client 66. In a present embodiment, each client 66 is configured to have any content 56 pushed to its non-volatile storage unit via push server 86 and its respective secondary intermediation server 78.

Figure 2:
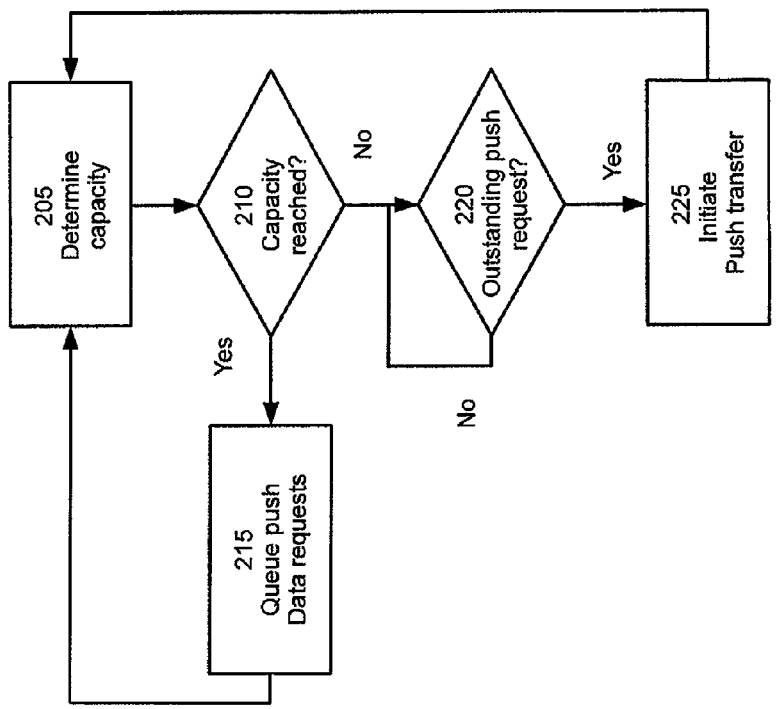
FIG. 2 shows a flowchart depicting a method for managing push data transfers.

Referring now to FIG. 2, a method for managing push data transfers is represented in the form of a flowchart and indicated generally at 200. Method 200 can be implemented using system 50 or variations thereof. In particular, method 200 can also be implemented by push server 86.

Block 205 comprises determining a capacity. The capacity represents the maximum number of push transfers that are to be simultaneously managed using method 200. The capacity can be fixed or predefined as part of an architecting system 50, or the capacity may change in real time, during or even throughout each performance of method 200. Generally, the capacity may be based on a level of consumption of resources throughout system 50, reflecting the maximum capacity overall which results from whichever component in system 50 has the least capacity. Those skilled in the art will recognize that the available resources within system 50 are dynamic, particularly where the components in system 50 have multiple functions beyond the function of effecting push data transfers of content 56 from one or more servers 54 to one or more computing devices 66. Furthermore, different branches of system 50 may have different capacities. For example link 62-1, link 82-2 and link 70-1 which would be used to push content 56-1 to device 66-1 in their aggregate may have a first capacity, while link 62-n, link 82-l and link 70-k in their aggregate may have a second capacity different from the first capacity. Such link capacities may be based on bandwidth, for example. Furthermore, in addition to links having different capacities, servers 54 may each have different capacities, whereby server 54-n has a different capacity than server 54-1. By the same token, second server 78-l may have a different capacity that server 78-1. In any event, push server 86 will have its own capacity regardless of the capacity of other components in system 50. Also, each device 66 will have its own capacity to accept push data transfers. Such server 86 and device 66 capacities may be based on processor speed, amount of memory, network interface limitations, and the number of other processing threads that are executing in addition to method 200. Other metrics for capacity will now occur to those skilled in the art. Furthermore, individual and aggregate capacities may change according to time of day or based on resource allocation priorities, or other factors. Accordingly, in more complex implementations of system 50, block 205 can comprise determining different capacities corresponding to different content 56 push data transfer scenarios, and managing the number of push transfers according to those different capacities. However, for purposes of providing a simplified (but non-limiting) illustration of method 200, it will be assumed that a maximum capacity of two is determined at block 205. In a further variation, which can be provided in addition to or lieu of the foregoing, an application programming interface can be provided at one or more of servers 54, server 86, or server 78, or other suitable location in system 50, where an administrator can manually set the capacity to a predefined level, including a level of "zero", so that at a local level the resources that are consumed by push data transfers can be manually controlled.

Block 210 comprises determining whether the capacity at block 205 has been reached. When method 200 is performed by push server 86, push server 86 can examine a counter or other software object that represents the number of data transfers currently being pushed from servers 86 to devices 66. If the capacity defined at block 205 has been exceeded (e.g. according the specific example referenced above, a counter or software object indicates that two or more push data transfers are currently being effected) then method 200 advances to block 215 at which point any further push data transfer requests are queued, and then method 200 cycles back to block 205. The means by which such queuing is effected is not particularly limited. For example, push server 86 can be configured to locally maintain a record of push data transfer requests, or push server 86 can be configured, at block 215, to reject, ignore or drop push data requests, with or without the return of an error message, leaving it to the requesting network component to reissue the push data request. At this point it can also be noted that push data transfer requests reflect any instruction to push server 86 to transfer content 56 from a given server 54 to a given device 66, and that such instructions can originate from any component in system 50, and typically do not originate from the device 66 itself. More typically, a request to push content 56 originates from it own server 54: For example a request to push content 56-1 to a given device 66 originates from server 54-1 itself, while a request to push content 56-n to a given device 66 originates from server 54-n.

It can also be noted that the source of a push data request can be reflective of the nature or type of content 56, but that in any event the nature or type of content 56 is not particularly limited. As a simple example, where device 66-1 has subscribed to a weather service hosted by, for example, server 54-1, then content 56-1 can reflect a weather report that is periodically pushed by server 54-1 to that device, thereby providing automatic weather report updates on device 66-1. Other types of content 56 can include, but are certainly not limited to, news, sports, traffic, stock, instant messages, social networking status updates, videos, music, chats, software applications, firmware updates, services and the like.

In this example, however, it will be assumed that during this initial performance of method 200, a total of zero transfers are currently being effected, and since "zero" is less than the exemplary "two" introduced above, a "no" determination is reached at block 210 and method 200 would therefore advance to block 220.

Block 220 comprises determining if there are any outstanding push requests. Again, in the specific example contemplated in relation to system 50, block 220 is effected by server 86 waiting for a new push data transfer request, or, where server 86 maintains queues of unprocessed push data transfer requests, then examining such a queue to determine if any push data requests are within that queue. A "No" determination at block 220 results in looping at block 220, effectively placing server 86 into a "wait" state until a push data transfer request is received. A "yes" determination at block 220 leads to block 225.

Block 225 comprises initiating a push data transfer request. In the specific example contemplated in relation to system 50, block 225 is effected by server 86 commencing a push data transfer and without actually waiting for such a transfer to complete, method 200 cycles back to block 205 where method 200 begins anew. It can be noted that when block 225 is reached a number of times that is equal to the capacity determined at block 205, then "yes" determinations will be made at block 210 resulting in cessation of processing of further push data transfer requests. Accordingly, and as will be discussed further below a parallel method is performed which monitors progress of push data transfers and track (or possibly deems) completion of push data transfers so as to reduce the likelihood of method 200 being prevented from reaching block 220, due to a persistent "yes" determination being made at block 210.

Figure 3:
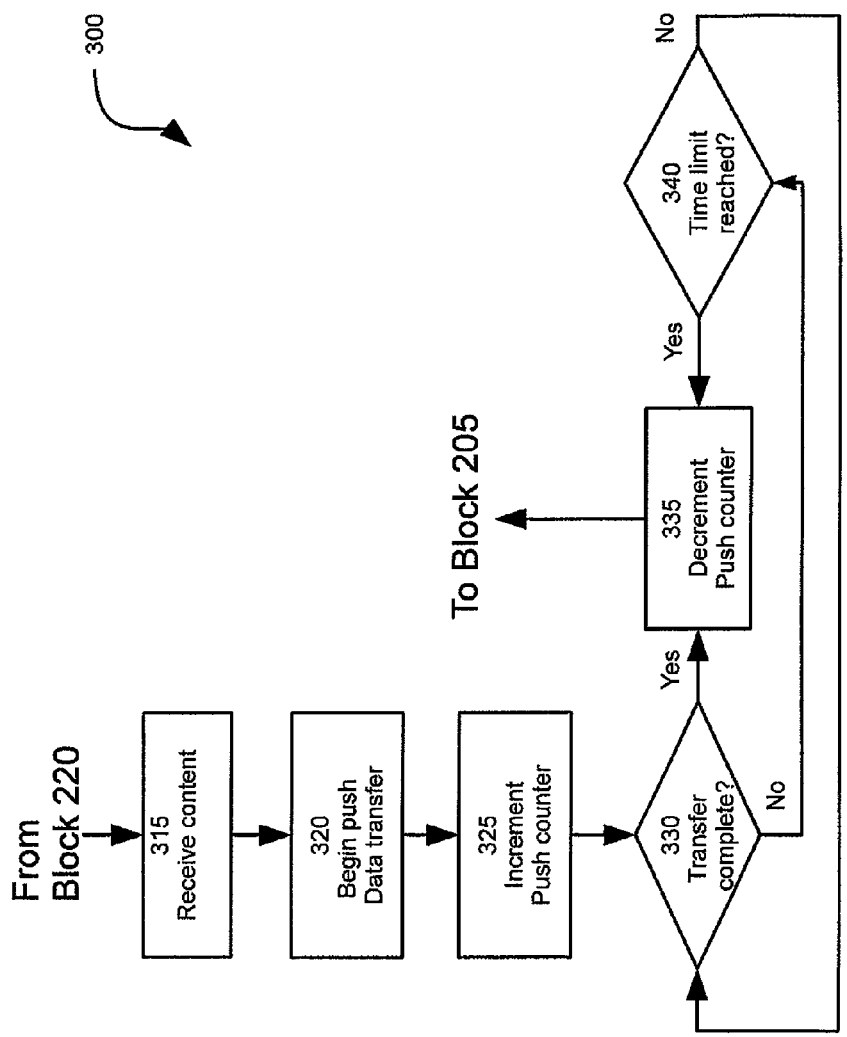
FIG. 3 shows an exemplary method of pushing data in conjunction with the method of FIG. 2.

Method 300 as shown in FIG. 3 provides a non-limiting example of a method that can be performed in parallel to method 200 so as to reduce the likelihood of method 200 being prevented from reaching block 220 from block 210.

Block 315 comprises receiving content. In the specific example contemplated in relation to system 50, block 315 is effected by push data server 86 receiving a particular item of content 56 from its respective server 54. For example, assume that a pending data transfer request comprises a request to push content 56-1 to device 66-1. Accordingly, as part of performing block 315, content 56-1 is received locally at push data server 86.

Block 320 comprises beginning a push data transfer of the content received at block 315. In the specific example being discussed, block 320 is effected by push data server 86 initiating a transfer of content 56-1 from push data server 86 to device 66-1, making appropriate use if link 82-1 and server 78-1 and link 70-1.

Block 325 comprises incrementing a counter. The counter increments the recorded number of active downloads and is accessible at block 210 in order to determine the number of currently active push data transfers. In accordance with the example discussed above, the counter will therefore increase to "one" from "zero" during this invocation of block 325, such that a parallel performance of block 210 will still result in a "No" determination leading method 200 to block 220 from block 210.

Block 330 comprises determining if the push data transfer that was initiated at block 320 is complete. A "yes" determination is made at block 330 when an acknowledgment is received from device 66-1, or server 78-1, at server 86, expressly confirming that content 56-1 has been received by device 66-1. The duration of time to complete the push data transfer can vary according to the size of content 56-1, and the amount of bandwidth available between push data server 86 and device 66-1, and accordingly it is contemplated that a "no" determination may be made at block 330.

On a "no" determination at block 330, method 300 advances to block 340 at which point a determination is made as to whether a predefined time limit has been reached. The method by which such a time limit is reached is not particularly limited, although a presently contemplated method is discussed further below. In general, the time limit corresponds to an expected time for the transfer to complete.

Block 335, which can be reached from a "yes" determination at either block 330 or block 340, comprises decrementing the counter that was incremented at block 325. In accordance with the example discussed above, and assuming no other invocations of method 300 have occurred, then counter will therefore decrease to "zero" from "one" during this invocation of block 335, such that a parallel performance of block 210 will also result in a "No" determination leading method 200 to block 220 from block 210.

From block 335, a return is made to block 205 of method 200.

Having discussed a simple invocation of method 200 and method 300 involving only a single push data transfer, those skilled in the art will now appreciate the behavior of system 50 when multiple, simultaneous push data transfer requests are received by push data server 86. For example, recall a hypothetical capacity of two push data transfer requests is determined at block 205. Now assume that three push data transfer requests are received at server 86: initially, two are received from server 54-1 and then subsequently, one is received from server 54-n while the first two from server 54-1 are still be processed using method 200 and method 300. When the third data transfer request is received at server 86, method 200 will reach block 215 and the third data transfer request will be queued until one of the first two is determined to be actually completed at block 330, or one of the first to is deemed to be completed at block 340. Those skilled in the art will now also appreciate one of the advantages of the present specification, in that in the event an express acknowledgement of a push data transfer is never received at block 330, then push data transfers from server 86 can still continue due to the deeming of such completion occurring due to performance of block 340. At the same time, method 200 and method 300 also regulate the utilization of network resources in system 50, so that push data transfers (or other functions of system 50) do not fail due to overwhelming of those resources due to an overabundance of push data transfers.

Figure 4:
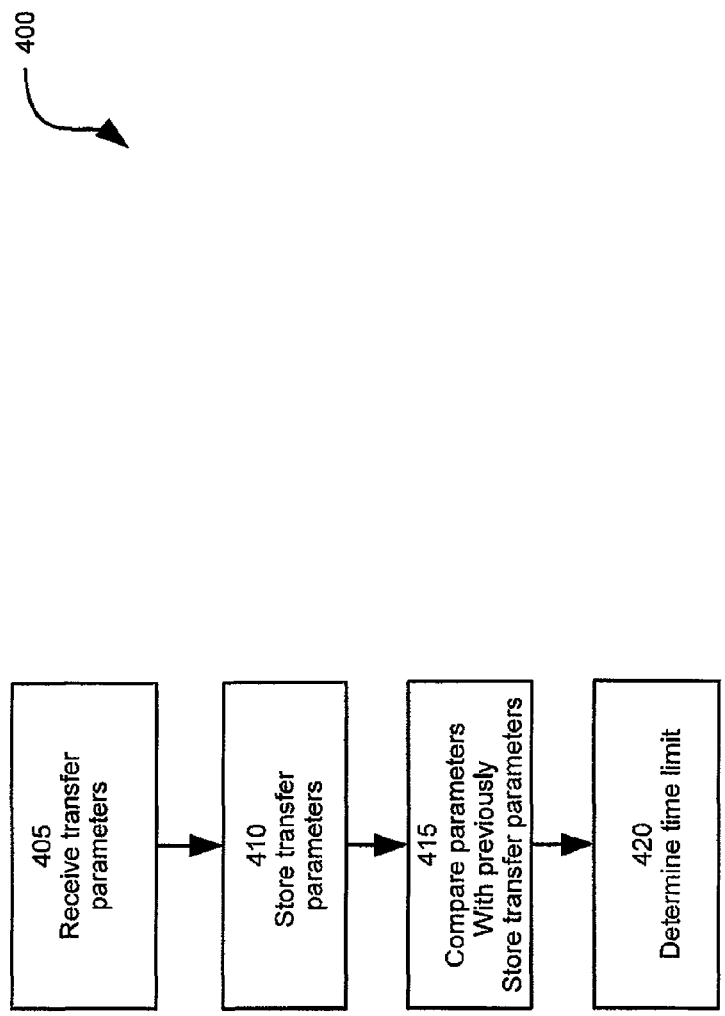
FIG. 4 shows an exemplary method of determining a time period in relation to block 340 of the method of FIG. 3.

As indicated above, the means by which the time-limit used in block 340 can be determined is not particularly limited. A simple predefined time period can be preselected. In a more complex implementation, the time-limit may dynamically change according to historical behavior of system 50, including but not limited to tracking the history of acknowledged data transfers. Method 400 in FIG. 4 shows on non-limiting example of how the time limit in block 340 can be determined using such historical tracking. Method 400 can be run from time to time, or in real time in conjunction with method 200 and method 300 to constantly update a time limit that will be used for specific performances of method 300. Block 405 comprises receiving transfer parameters. Block 405 thus comprises receiving at server 86 or at another computational resource data representing parameters of a historic, successfully completed push data transfer whereby an express acknowledgement was actually received confirming completion of the specific push data transfer. Server 86 can, for example, be configured to input data into block 405 every time a "yes" determination is reached at block 330. Such data at block 405 can be comprise to a simple identification of the content 56 that was successfully transferred, as well as the time it took to complete that transfer. The data received at block 405 can further comprise an identification of the specific links, servers or other network resources involved in the transfer.

Block 410 comprises storing the transfer parameters received at block 405 in a table or other data base resource. Block 415 comprises comparing all of the parameters in the table or other data base resource, and block 420 comprises determining a time limit to be used at block 340 based on the comparison from block 415. The operations used to perform the comparison at block 415 and the determination at block 420 are not particularly limited. In one implementation, block 415 and block 420 apply a probability model to the performance of system 50 such that server 86 can infer with a high degree of confidence that data transfers are actually completed, even though no completion status (i.e. a "yes" determination") has been determined at block 330. The time limit that is established for block 340 may be determined by historical tracking of successful push data transfers where acknowledgements of such completions are actually received at block 330 and thereby result in a "yes" determination at block 330. A table of values can be compiled of historical data from various performances of block 405 and block 410 that comprises the beginning time and ending time of push data transfers, and can also comprise transfer duration, content size, which server 78 is used, and which of links 62, 82 and 70 were utilized. Where a plurality of push data servers 86 are employed within a variation of system 50, the table of values can additionally comprise an indication of which push data server 86 was employed. Using the table, server 86 or other computational device can be employed to determine a mean and standard deviation for the sample data that best matches an expected duration of time, which can then be employed to establish a time limit for use at block 340 in relation to a particular push data transfer during a particular cycle of method 300. A Cumulative Distribution Function (CDF) can be employed to determine a minimum time duration that would account for the minimum cumulative probability needed to assume completion of a push data transfer that is initiated at block 320. Accordingly, the time limit established for block 340 can vary between each invocation of method 300, according the specific circumstances of a particular push data transfer.

In preliminary calculations performed by the inventor, sample data recorded in a table for a system that is reflective of system 50 substantially matches a normal distribution. However, the inventor further believes that versions of system 50 where statistical calculations generate data that do not fit a normal distribution can still be used to generate a time limit for block 340, as in such a situation lacking a normal distribution, instead of calculating the mean and standard deviation, the time limit can be based on about the 95th percentile value for the sample data that is applicable. Thus, in a variation, the time limit established for block 340 may be based on a value that accounts for only about 95% of all download durations in the above-referenced table of values. The remaining about 5% of transfers that exceed a value may be deemed to be an acceptable failure risk and permit the maximum to be exceeded but by a fairly limited amount.

It should now be understood that variations, subsets or combinations or all of them are contemplated.

The invention claimed is:

1. A method for managing push data transfers comprising:
   receiving a push data transfer request at a push data server from a content server for push delivery of content to one of a plurality of computing devices;
   comparing a counter representing a number of push data transfers concurrently being effected from the push data server to the plurality of computing devices to a maximum number of concurrent push data transfers permitted to be effected from the push data server to the plurality of computing devices;
   when the counter is less than the maximum, beginning a push data transfer of the content to the one computing device from the push data server, and incrementing the counter;
   when an acknowledgement indicating that the push data transfer is completed is received, decrementing the counter; and
   when no acknowledgement indicating that the push data transfer is completed is received within a predefined time limit, deeming the push data transfer to be completed and decrementing the counter without terminating the push data transfer.

2. The method of claim 1, comprising:
   receiving, at the push data server, transfer parameters, the transfer parameters including data representing parameters of a historic successfully completed push data transfer; and
   determining the predefined time limit by comparing the transfer parameters.

3. The method of claim 2, wherein the transfer parameters further include at least one of a beginning time and ending time, a transfer duration, a content size, server specifications, and link specifications.

4. The method of claim 3, wherein the push data transfer is determined to be actually completed when an acknowledgement is received, by the push data server, confirming completion of the push data transfer.

5. The method of claim 4, wherein comparing the transfer parameters includes applying a probability model.

6. The method of claim 5, wherein the applying a probability model includes:
   compiling a table of values of the transfer parameters; and
   determining a mean and standard deviation for the transfer parameters.

7. The method of claim 5, wherein the applying a probability model includes employing a cumulative distribution function to determine a minimum time duration to be used as the predefined time limit.

8. The method of claim 7, further comprising:
   when the maximum number equals the counter, queuing the push data transfer request.

9. The method of claim 8, wherein the queuing the push data transfer request includes maintaining, at the push data server, a record of push data transfer requests.

10. The method of claim 8, wherein the queuing the push data transfer request includes rejecting the push data request.

11. The method of claim 10, wherein the rejecting the push data transfer request includes sending an error message to the content server.

12. The method of claim 11, comprising tracking of successful push data transfers where acknowledgements of completions are received at the push data server.

13. A push data server comprising:
   a memory;
   a network interface; and
   a processor interconnected with the memory and the network interface, the processor configured to:
      receive a push data transfer request via the network interface, from a content server, for push delivery of content to one of a plurality of computing devices;
      compare a counter representing a number of push data transfers concurrently being effected from the push data server to the plurality of computing devices to a maximum number of concurrent push data transfers permitted to be effected from the push data server to the plurality of computing devices;
      when the counter is less than the maximum, control the network interface to begin a push data transfer of the content to the one computing device, and increment the counter;
      when an acknowledgement indicating that the push data transfer is completed is received, decrement the counter; and
      when no acknowledgement indicating that the push data transfer is completed is received within a predefined time limit, deem the push data transfer to be completed and decrement the counter without terminating the push data transfer.

14. The push data server of claim 13, wherein the processor is further configured to:
   receive transfer parameters, the transfer parameters including data representing parameters of a historic successfully completed push data transfer; and
   determine the predefined time limit by comparing the transfer parameters.

15. The push data server of claim 14, wherein the transfer parameters further include at least one of a beginning time and ending time, a transfer duration, a content size, server specifications, and link specifications.

16. The push data server of claim 15, wherein the processor is further configured to determine that the push data transfer is actually completed when the processor receives an acknowledgement confirming completion of the push data transfer.

17. A non-transitory computer readable storage medium for a push data server, the computer readable storage medium having a computer-readable program code adapted to be executable on the push data server to implement a method for managing push data transfers, the method comprising:
- receiving a push data transfer request at a push data server from a content server for push delivery of content to one of a plurality of computing devices;
- comparing a counter representing a number of push data transfers concurrently being effected from the push data server to the plurality of computing devices to a maximum number of concurrent push data transfers permitted to be effected from the push data server to the plurality of computing devices;
- when the counter is less than the maximum, beginning a push data transfer of the content to the one computing device from the push data server, and incrementing the counter;
- when an acknowledgement indicating that the push data transfer is completed is received, decrementing the counter;
- when no acknowledgement indicating that the push data transfer is completed is received within a predefined time limit, deeming the push data transfer to be completed and decrementing the counter without terminating the push data transfer.

* * * * *